United States Patent [19]

Lai

[11] Patent Number: 5,443,301

[45] Date of Patent: Aug. 22, 1995

[54] SADDLE MOUNTING FRAME ASSEMBLY

[76] Inventor: Yen-Pin Lai, No. 199, Wu Tung South Road, Pu Hsin Hsiang, Changhwa Hsien, Taiwan

[21] Appl. No.: 144,520

[22] Filed: Nov. 2, 1993

[51] Int. Cl.⁶ .............................................. B62J 1/02
[52] U.S. Cl. ................................ 297/195.1; 297/440.24
[58] Field of Search ............. 297/195.1, 216.1, 216.17, 297/208, 209, 440.24, 205, 211; 280/275, 283; 267/141.1, 153

[56] References Cited

U.S. PATENT DOCUMENTS

| 651,277 | 6/1900 | Smith | 297/211 X |
|---|---|---|---|
| 4,629,154 | 12/1986 | Kataczynski | 267/153 X |
| 4,987,764 | 1/1991 | Chen | 297/195.1 X |
| 5,020,851 | 6/1991 | Chen | 297/195.1 |
| 5,310,203 | 5/1994 | Chen | 267/141.1 |

Primary Examiner—James R. Brittain
Assistant Examiner—Milton Nelson, Jr.
Attorney, Agent, or Firm—Varndell Legal Group

[57] ABSTRACT

A saddle mounting frame assembly includes a seat post, which consists of a master tube and an auxiliary tube welded to the master tube at one side, an upper clamping plate, a lower clamping plate having a hollow bottom shaft fitted into the master tube, a fastening device to fasten the upper and lower clamping plates together permitting them to be fastened to a saddle, an adjusting screw to fasten the fastening device to the auxiliary tube, a first shock absorbing element fitted into the master tube and stopped between a blocking plate inside the master tube and the bottom shaft of the lower clamping plate, and a second shock absorbing element fitted into the auxiliary tube to support the fastening device.

2 Claims, 3 Drawing Sheets

SADDLE MOUNTING FRAME ASSEMBLY

BACKGROUND OF THE INVENTION

The present invention relates to a saddle mounting frame assembly for supporting the saddle of a bicycle, motorcycle, etc.

The saddle mounting frame assembly of a regular bicycle, as shown in FIG. 1, is generally comprised of a seat tube, and a seat post fitted into the seat tube. The screws are threaded into respective screw holes on the seat tube and respective oblong holes on the seat post to prohibit rotary motion of the seat post relative to the seat tube. A compression spring is retained inside the seat tube by a slide block to support the seat post and to absorb shocks. The slide block is controlled by an adjusting screw to provide in the seat tube for adjusting the spring force of the compression spring. However, because the seat tube is fastened to the bicycle frame, the adjustment of the adjusting screw is difficult when installed. While riding the bicycle, the pressure of the load on the saddle is not evenly distributed through the seat post, and therefore noises tend to occur and the tie screws and the compression spring may be damaged easily.

SUMMARY OF THE INVENTION

The present invention has been accomplished to provide a saddle mounting frame assembly which eliminates the aforesaid drawbacks. According to the preferred embodiment of the present invention, the saddle mounting frame assembly is comprised of a seat post, which consists of a master tube and an auxiliary tube welded to the master tube at one side thereof, an upper clamping plate, a lower clamping plate having a hollow bottom shaft fitted into the master tube, a fastening device to fasten the upper and lower clamping plates together permitting them to be fastened to a saddle, an adjusting screw to fasten the fastening device to the auxiliary tube, a first shock absorbing element fitted into the master tube and stopped between a blocking plate inside the master tube and the bottom shaft of the lower clamping plate, and a second shock absorbing element fitted into the auxiliary tube to support the fastening device.

DETAILED DESCRIPTION OF THE PREFERRED EMBODIMENT

Figure 1:
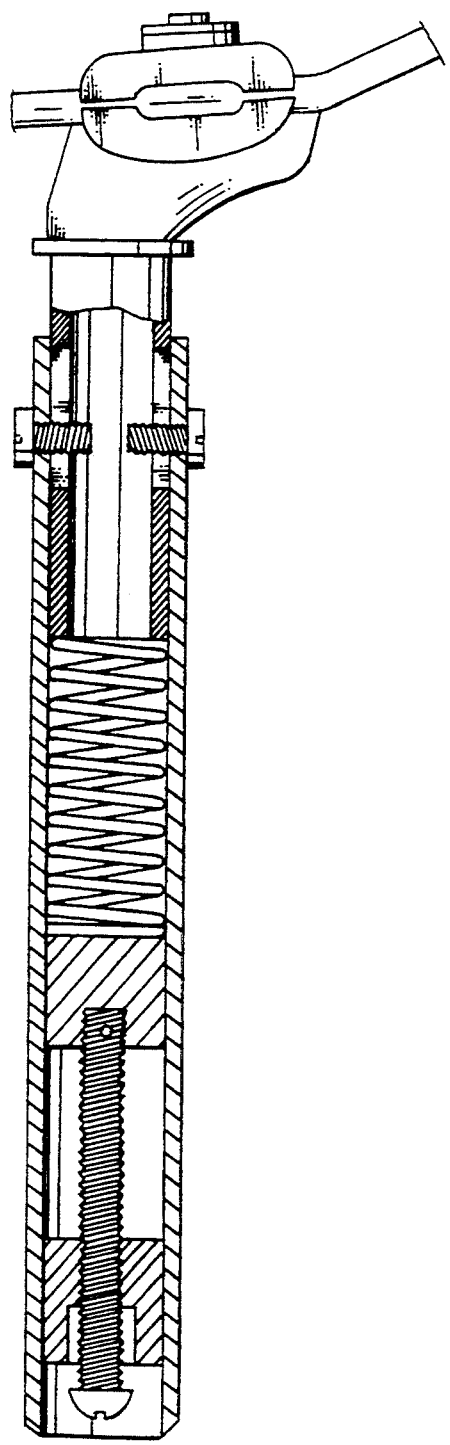
FIG. 1 is a longitudinal view in section of a saddle mounting frame assembly according to the prior art.
Figure 2:
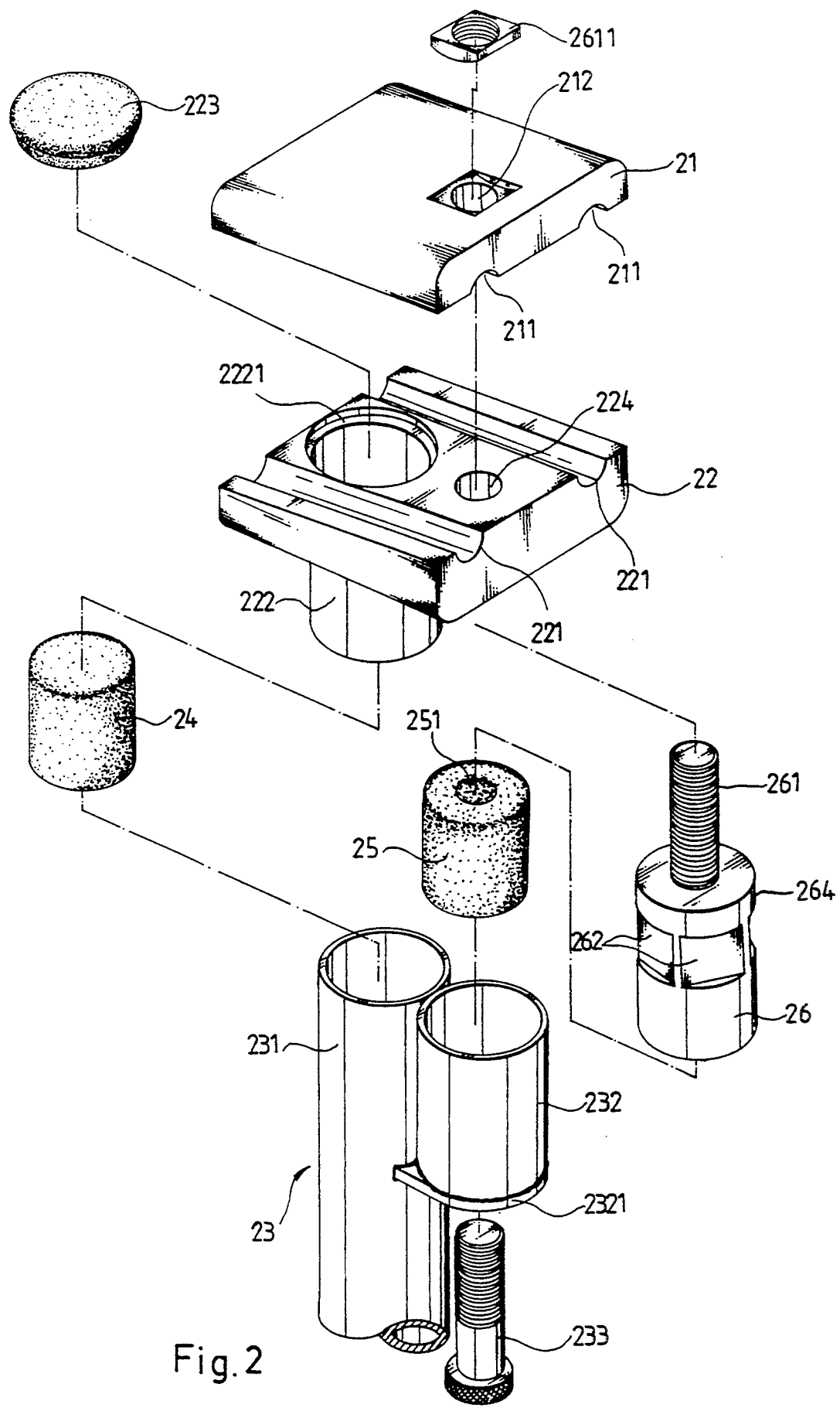
FIG. 2 is an exploded view of a saddle mounting frame assembly according to the preferred embodiment of the present invention.
Figure 3:
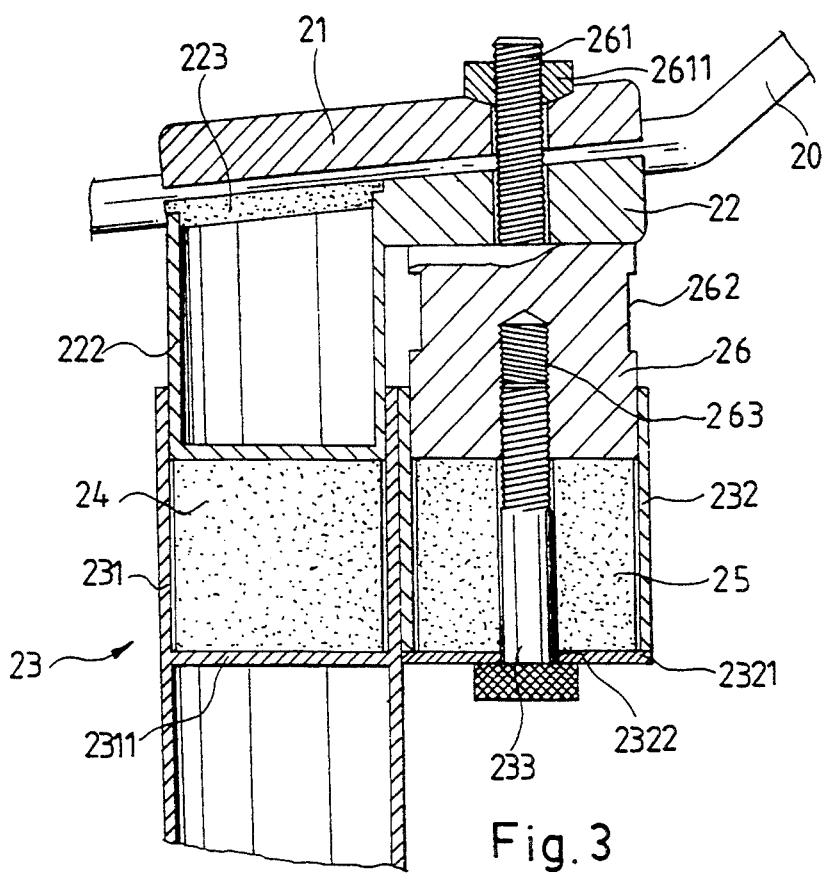
FIG. 3 is a longitudinal view in section of the saddle mounting frame assembly of FIG. 2 taken alone line 3—3 of FIG. 4 including the mounting rods of the saddle.
Figure 4:
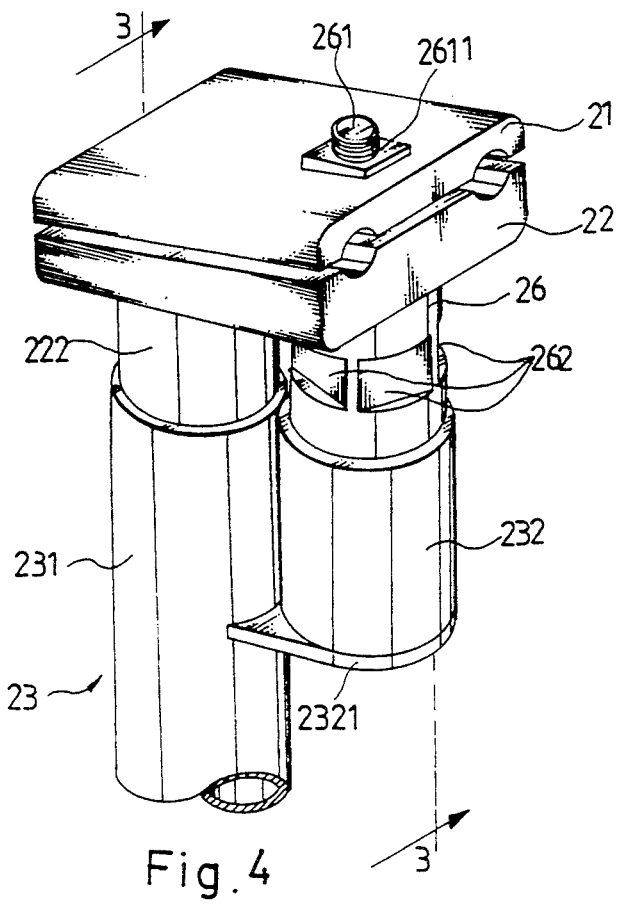
FIG. 4 is an elevational view of the saddle mounting frame assembly of FIG. 2.

Referring to FIGS. 2, 3 and 4, therein shown is a saddle mounting frame assembly made according to the preferred embodiment of the present invention for supporting a saddle, generally comprised of an upper clamping plate 21, a lower clamping plate 22, a seat post 23, a shock absorbing block 24, a shock absorbing ring 25, and a fastening device 26.

The upper clamping plate 21 comprises two spaced horizontal grooves 211 through the bottom surface thereof, which receives the mounting rods 20 of the saddle, a vertical through hole 212 disposed between the horizontal grooves 211. The bottom clamping plate 22 comprises two spaced horizontal grooves 221 through the top surface thereof, which receives the aforesaid mounting rods 20, a vertical through hole 224 connected to the vertical through hole 212 on the upper clamping plate 21 by the fastening device 26, a hollow shaft 222 vertically disposed at the bottom between the horizontal grooves 221. The hollow shaft 222 has a top opening 2221 sealed by a cap 223. The seat post 23 comprises a master tube 231, an auxiliary tube 232 welded to the master tube 231 at one side, and a reinforcing plate 2321 welded to the bottom of the auxiliary tube 232 and the outside wall of the master tube 231. The reinforcing plate 2321 has a through hole 2322, into which an adjusting screw 233 is inserted. The shock absorbing block 24 is made of cylindrical shape that is fitted into the master tube 231, having a bottom end supported on a blocking plate 2311 inside the master tube 231 and a top end stopped against the shaft 222. The shock absorbing ring 25 fits into the auxiliary tube 232 with the center through hole 251 thereof aligned with the through hole 2322 on the reinforcing plate 2321 for passing the adjusting screw 233, having a bottom end supported on the reinforcing plate 2321 and a top end stopped against the fastening device 26. The fastening device 26 comprises a screw rod 261 extended from the head 264 thereof. The head 264 of the fastening device 26 is partially inserted into the auxiliary tube 232 and stopped against the shock absorbing ring 25, having a screw hole 263 on the top thereof in the center, into which the adjusting screw 233 is threaded, and six flat surfaces 262 around the periphery for turning with a socket wrench. The screw rod 261 of the fastening device 26 is inserted through the vertical through hole 224 on the bottom clamping plate 22 and the vertical through hole 212 on the upper clamping plate 21 and then screwed up with a nut 2611 to fasten the upper and lower clamping plates 21, 22 to the mounting rods 20 of the saddle.

I claim:
1. A saddle mounting frame assembly comprising:
a seat post which comprises a master tube, an auxiliary tube welded to said master tube at one side thereof, and a reinforcing plate welded to said master tube and said auxiliary tube in a horizontal position to support said auxiliary tube, said reinforcing plate comprising a hole axially aligned with said auxiliary tube, an interior of said master tube including a horizontally arranged blocking plate;
an upper clamping plate and a lower clamping plate connected together for holding mounting rods of a saddle, said upper clamping plate comprising a vertical hole and two horizontal grooves on a bottom surface thereof for holding said mounting rods of a saddle, said lower clamping plate comprising a vertical hole axially aligned with said vertical hole of said upper clamping plate and two horizontal grooves fitted under said horizontal grooves of said upper clamping plate for holding said mounting rods of a saddle, and a hollow bottom shaft received in said master tube, said hollow bottom shaft having a top opening sealed with a cap;

a fastening device for fastening said upper and lower clamping plates together, said fastening device comprising a head fitted into said auxiliary tube, and a screw rod received in said vertical holes of said lower and upper clamping plates and fastened with a nut to hold said upper and lower clamping plates to said mounting rods of a saddle; said head of said fastening device comprising a center screw hole connected to said hole of said reinforcing plate by an adjusting screw, and six planes arranged around a periphery thereof disposed outside said auxiliary tube for turning with a socket wrench;

a first shock absorbing element fitted into said master tube and arranged between said blocking plate and said hollow shaft of said lower clamping plate; and a second shock absorbing element fitted into said auxiliary tube and arranged between said reinforcing plate and said head of said fastening device and mounted around said adjusting screw.

2. The saddle mounting frame assembly of claim 1, wherein said first shock absorbing element and said second shock absorbing element are respectively a compression spring.

* * * * *